2 Sheets—Sheet 1.

G. E. JONES.

MACHINE FOR WINDING UP PAPER.

No. 10,611. Reissued June 16, 1885.

WITNESSES:

William Miller

Otto Hufeland

INVENTOR

Gilbert E. Jones

BY Van Santwood & Hauff

ATTORNEYS

2 Sheets—Sheet 2.

G. E. JONES.

MACHINE FOR WINDING UP PAPER.

No. 10,611. Reissued June 16, 1885.

WITNESSES:

William Miller

Otto Hufeland

INVENTOR

Gilbert E. Jones

BY

Van Santvoord & Sheaff

ATTORNEYS

UNITED STATES PATENT OFFICE.

GILBERT E. JONES, OF NEW YORK, N. Y.

MACHINE FOR WINDING UP PAPER.

SPECIFICATION forming part of Reissued Letters Patent No. 10,611, dated June 16, 1885.

Original No. 186,256, dated January 16, 1877. Application for reissue filed March 11, 1885.

*To all whom it may concern:*

Be it known that I, GILBERT E. JONES, a citizen of the United States, residing at New York, in the county and State of New York, have invented new and useful Improvements in Machines for Winding up Paper, of which the following is a specification.

This invention consists in a winding-machine having a delivery-roll, a power-roll, and a winding-up roll which is held in arms, guides, or ways which are provided with frictional boxes or slides, and which is thrown toward the power-roll by gravity.

Figure 1:
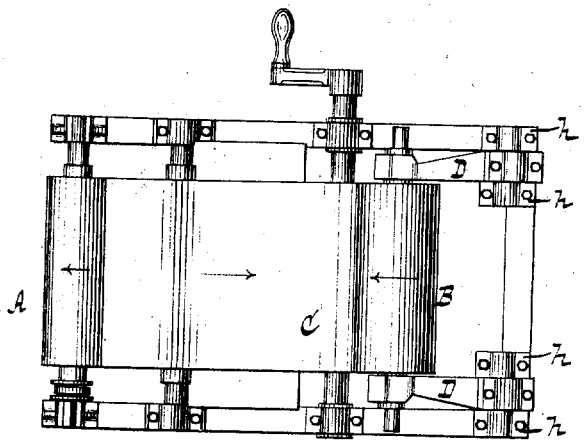
Figure 2:
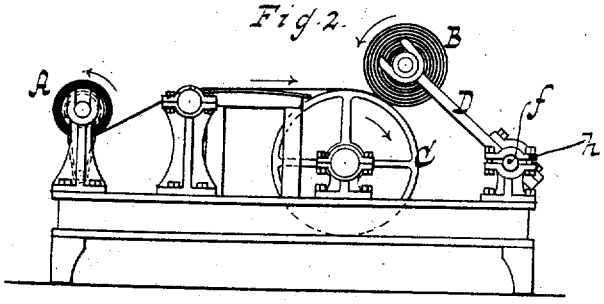
Figure 3:
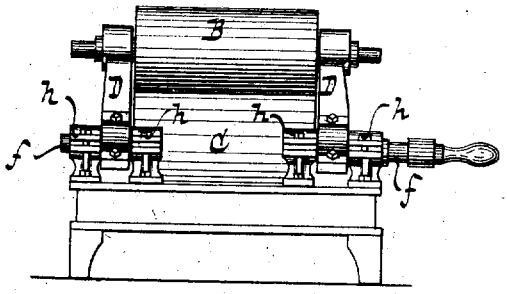
Figure 4:
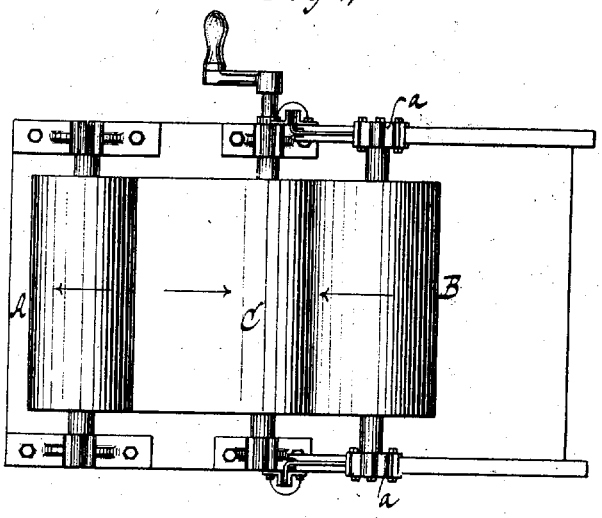
Figure 5:
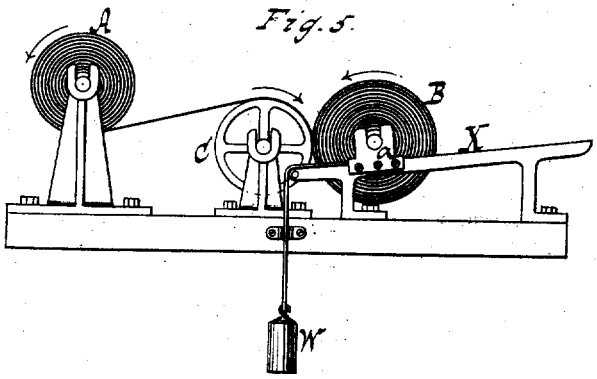

In the accompanying drawings, Figure 1 is a top view of a machine arranged to wind dampened or dry paper. Fig. 2 is a side view of the same. Fig. 3 is an end view of the same. Fig. 4 is a top view of a modification. Fig 5 is a side view of the same.

Winding-machines are constructed either for dry or dampened paper or for other fabrics, which machines usually consist of a roll from which the fabric is being unwound, and of a roll upon which it is being wound, the latter resting and pressing upon a power-roll or driving-roll made of iron or other material, and from the frictional contact with which the roll being formed is driven or revolved. By this arrangement the speed of the fabric between the delivery-roll and the winding-up roll is always the same.

It has heretofore been the practice to create the necessary amount of pressure between the roll being formed and the power-roll by the weight of the winding-up roll itself, as the same bears upon the power-roll, combined with weights appropriately attached to the machine.

In the machine in which the weights are used without the frictional boxes or slides, the roll being formed will not revolve steadily and smoothly with the power-roll, but will continually jump backward and forward to and from the power-roll, and the roll of fabric when formed will never be perfectly true and even; but when friction is employed in addition to gravity, to resist the backward or upward movement of the roll being formed from the power-roll, the former, even when revolving at a circumferential speed of thirty miles an hour, will be perfectly true and even, and no perceptible jumping will take place.

In Figs. 1, 2, and 3 the letter A designates the roll from which the dry paper is taken or unwound. The paper then passes over a table or support, and water is thrown upon it in the form of a fine spray. The paper thus dampened is wound into a roll, (shown at B,) which roll rests upon and is turned by a power-roll, C, the latter being revolved by a belt or in some other suitable manner. The roll B is held by arms D D, which are inclined towards the power-roll C, and which at their lower ends are provided with pins *f f*, turning in suitable boxes, thus allowing the spindle of the roll B to move away from the roll C as the roll B is enlarged by the addition of the paper. The bearings or journal-boxes *h h h h*, in which the pins *f f* of the arms D rest, I make with a cap and bolts in each box, so that the power necessary to elevate the arms can be adjusted by tightening or loosening the bolts. Thus, when the machine is in operation the pressure between the rolls B and C is increased beyond that due to the weight of the winding-up roll B, this roll will not perceptibly jump away from the roll C, and the completed roll of paper will be true and even. A mere increase of the pressure between the rolls B and C by weights does not produce the desired effect.

In Figs. 4 and 5 the letter A designates the the roll from which the fabric is taken. C is the power-roll, and B is the winding-up roll. X X are inclined guides which carry boxes or journals *a* of the spindle of the roll B, and these boxes are constructed so as to clamp closely the guides X X by set-screws, as shown, on the sides of the boxes *a*. The slides X X are inclined, so that the roll B is held in contact with the power-roll by its own gravity, and when boxes *a* have been clamped on the guides and the machine is set in operation the pressure between the rolls B and C will be augmented by the power required to overcome the friction between the boxes and the guides.

With my invention using friction in addition to the gravity of the roll, movement of said roll away from the pressure-roll will be resisted, while its movement toward the pressure-roll is also resisted by the friction, the thumping of the roll B against the power-roll is prevented, and said roll B will be perfectly even when finished, while with the weights and no friction other than necessarily existing in the moving parts, the roll B will thump against the power-roll, and will not, when finished, be perfectly true and even.

Various other forms and designs of machine may be adopted. The roll being formed may be directly over the power-roll and rise vertically from it. With this design the resistance offered by the friction to the paper-roll's upward movement, in addition to the weight of the paper-roll itself, will cause said roll to be made evenly and truly, and will prevent all jumping.

I find out the proper amount of friction necessary in any winder by starting the machine without friction upon the journals or slides, and I gradually increase the friction till all thumping and unevenness are obviated and the machine operates steadily and smoothly, producing perfectly even rolls of paper.

I do not claim, broadly, as my invention a winding-machine having a delivery-roll, a winding-up roll held in arms, guides, or ways which are provided with friction-boxes, combined with a power-roll, since I have recently found that a machine containing the above-named features has been described and illustrated in a printed publication prior to my invention thereof.

In this machine the winding-up roll is hung in arms which swing on a vertical axis, so that the gravity of said roll does not hold the same in contact with the power-roll. A machine of that kind may be used with advantage for winding up cloth or other material strong enough to hold the winding-up roll in contact with the power-roll by its own tension; but my experiments show that such a machine can not be used for winding up paper, since the paper is not strong enough to prevent the winding-up roll from being thrown out of contact with the paper-roll, and when an attempt is made to wind up paper on a machine of this kind the paper will tear after a few revolutions of the roll.

What I claim as new, and desire to secure by Letters Patent, is—

In a winding-machine, the combination, with the delivering-roll and the power-roll, of a winding-up roll which is held in arms, guides, or ways which are provided with frictional boxes or slides, and which is thrown toward the power-roll by gravity.

In testimony whereof I have hereunto set my hand and seal in the presence of two subscribing witnesses.

GILBERT E. JONES. [L. S.]

Witnesses:
W. HAUFF,
E. F. KASTENHUBER.